United States Patent [19]
Gardos et al.

[11] Patent Number: 5,737,537
[45] Date of Patent: Apr. 7, 1998

[54] TWO-MEASURE BLOCK CLASSIFICATION SCHEME FOR ENCODING VIDEO IMAGES

[75] Inventors: Thomas R. Gardos, Portland; Vaughn Iverson, Beaverton, both of Oreg.

[73] Assignee: Intel Corporation, Santa Clara, Calif.

[21] Appl. No.: 536,671

[22] Filed: Sep. 29, 1995

[51] Int. Cl.$^6$ ..................................................... H04N 1/41
[52] U.S. Cl. ........................ 395/200.77; 358/539
[58] Field of Search .......................... 364/514 R, 715.02; 358/539, 538; 382/166, 236, 238; 395/114, 200.77

[56] References Cited

U.S. PATENT DOCUMENTS

| | | | |
|---|---|---|---|
| 5,488,570 | 1/1996 | Agarwal | 364/514 R |
| 5,585,944 | 12/1996 | Rodriguez | 358/500 |

*Primary Examiner*—Emanuel T. Voeltz
*Assistant Examiner*—Thomas Peeso
*Attorney, Agent, or Firm*—William H. Murray

[57] ABSTRACT

Blocks of video frames are classified for encoding, for example, as empty blocks, inter blocks, or intra blocks. This block classification is based on (at least) two statistical measures for each block: a global measure and a local measure. In a preferred embodiment, blocks are classified as empty blocks using an inter sum-of-absolute-differences (SAD) measure (a global measure) and a maximum-absolute-difference (MAD) measure (a local measure). The inter-SAD and MAD measures are generated for each block of the current frame relative to a corresponding reference block of a reference frame. If the inter-SAD and MAD measures are less than specified thresholds, then the block is classified as an empty block for encoding.

13 Claims, 8 Drawing Sheets

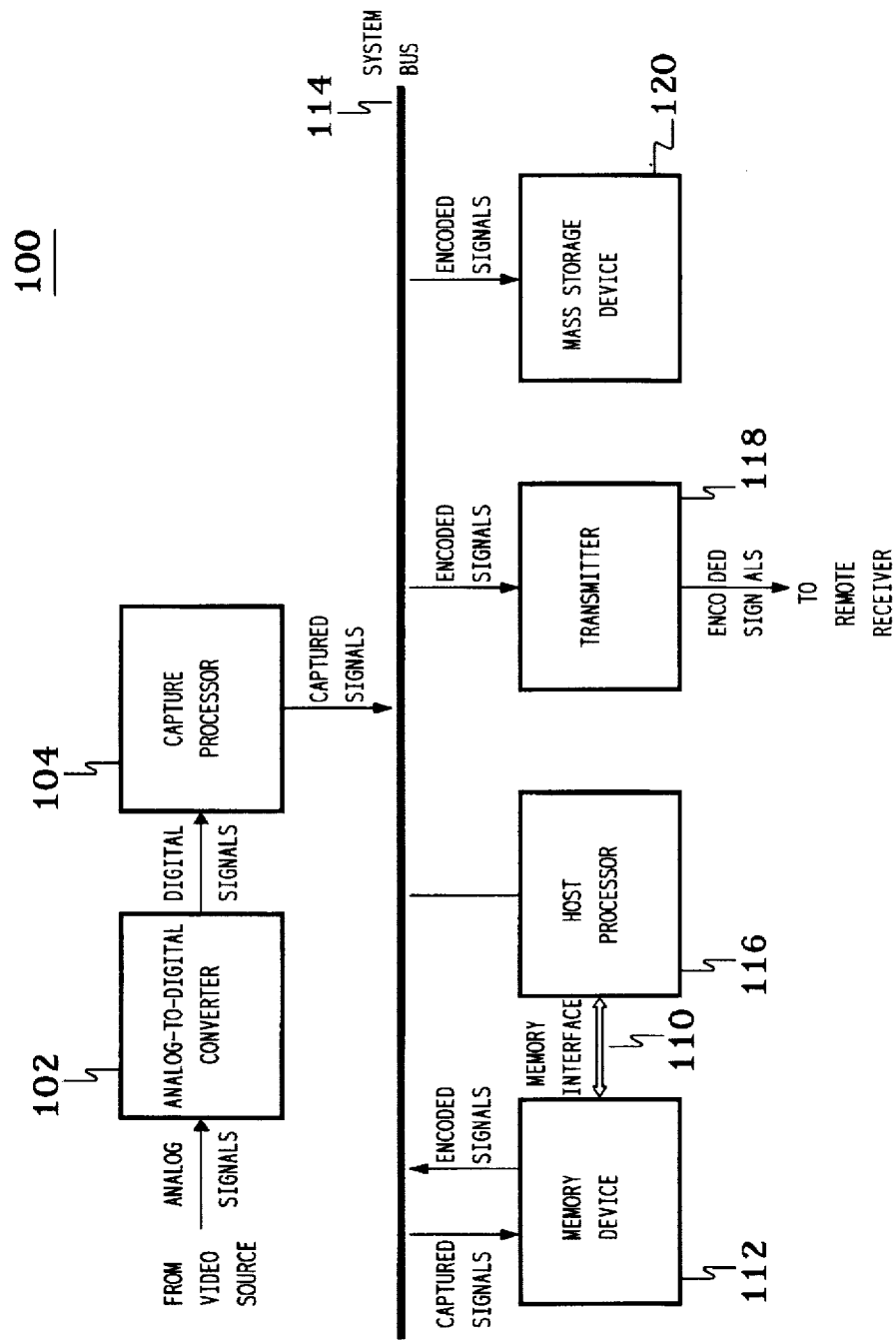
FIG. 1. ENCODING SYSTEM

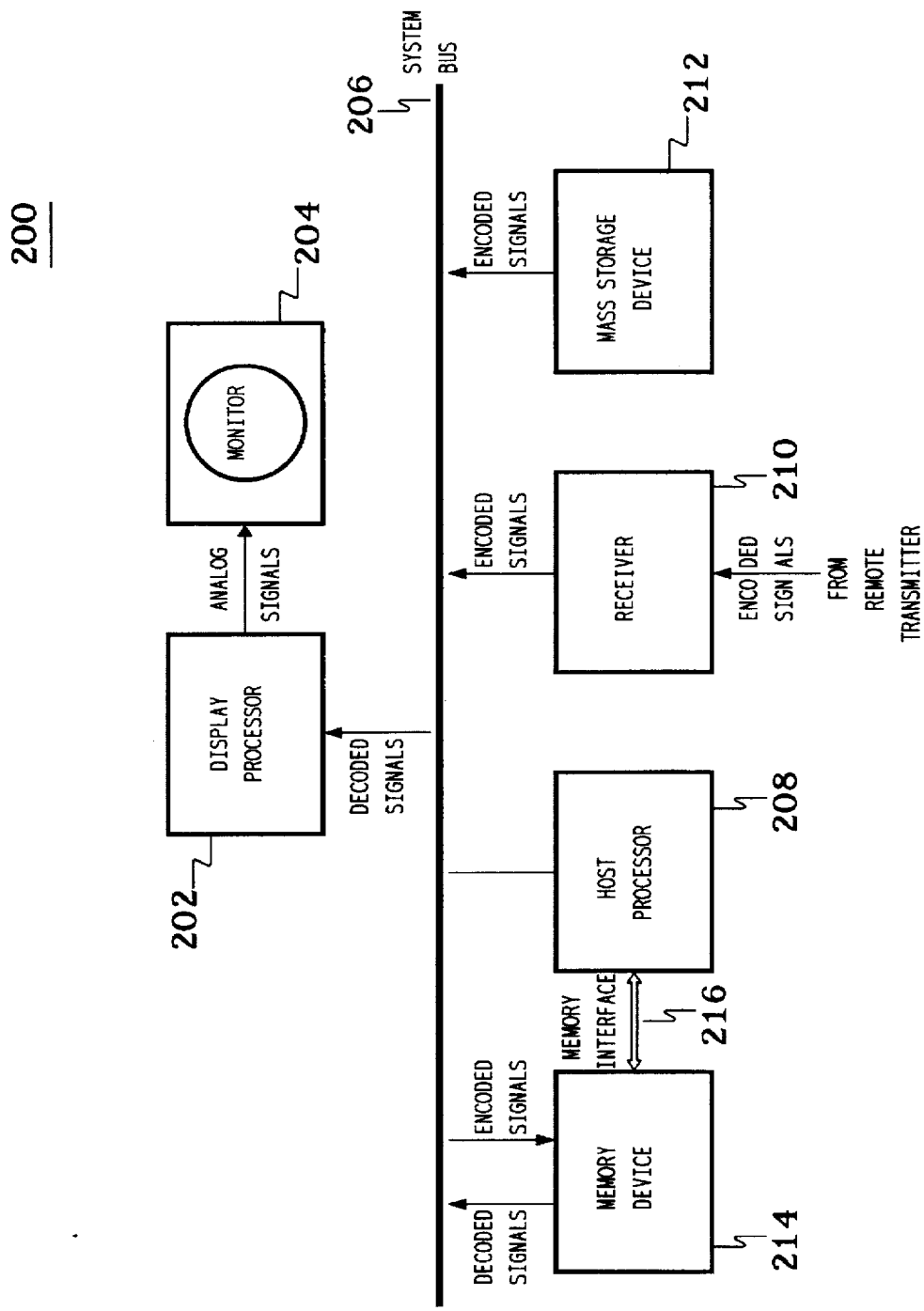
FIG. 2. DECODING SYSTEM

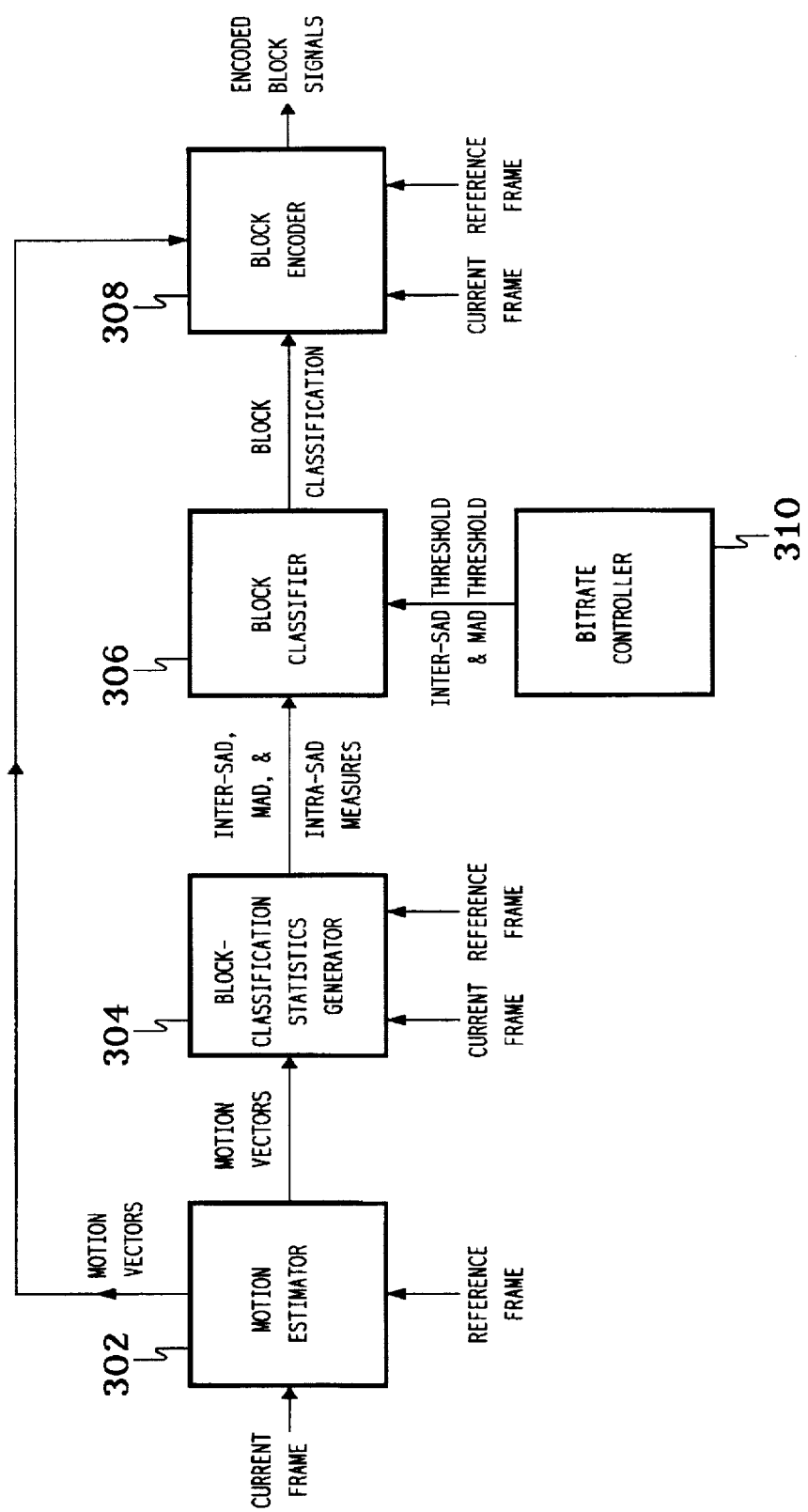
FIG. 3. BLOCK ENCODING

FIG. 4.   SUBSAMPLING PATTERN FOR MOTION ESTIMATION

FIG. 5.   SUBSAMPLING PATTERN FOR STATISTICAL MEASURES

|    | 0 | 1 | 2 | 3 | 4 | 5 | 6 | 7 | 8 | 9 | 10 | 11 | 12 | 13 | 14 | 15 |
|----|---|---|---|---|---|---|---|---|---|---|----|----|----|----|----|----|
| 0  | X | X |   | X |   | X |   | X | X |   | X  |    | X  |    | X  | X  |
| 1  | X | X |   | X |   | X |   | X | X |   | X  |    | X  |    | X  | X  |
| 2  |   |   |   |   |   |   |   |   |   |   |    |    |    |    |    |    |
| 3  | X | X |   | X |   | X |   | X | X |   | X  |    | X  |    | X  | X  |
| 4  |   |   |   |   |   |   |   |   |   |   |    |    |    |    |    |    |
| 5  | X | X |   | X |   | X |   | X | X |   | X  |    | X  |    | X  | X  |
| 6  |   |   |   |   |   |   |   |   |   |   |    |    |    |    |    |    |
| 7  | X | X |   | X |   | X |   | X | X |   | X  |    | X  |    | X  | X  |
| 8  | X | X |   | X |   | X |   | X | X |   | X  |    | X  |    | X  | X  |
| 9  |   |   |   |   |   |   |   |   |   |   |    |    |    |    |    |    |
| 10 | X | X |   | X |   | X |   | X | X |   | X  |    | X  |    | X  | X  |
| 11 |   |   |   |   |   |   |   |   |   |   |    |    |    |    |    |    |
| 12 | X | X |   | X |   | X |   | X | X |   | X  |    | X  |    | X  | X  |
| 13 |   |   |   |   |   |   |   |   |   |   |    |    |    |    |    |    |
| 14 | X | X |   | X |   | X |   | X | X |   | X  |    | X  |    | X  | X  |
| 15 | X | X |   | X |   | X |   | X | X |   | X  |    | X  |    | X  | X  |

FIG. 6A. BLOCK CLASSIFICATION
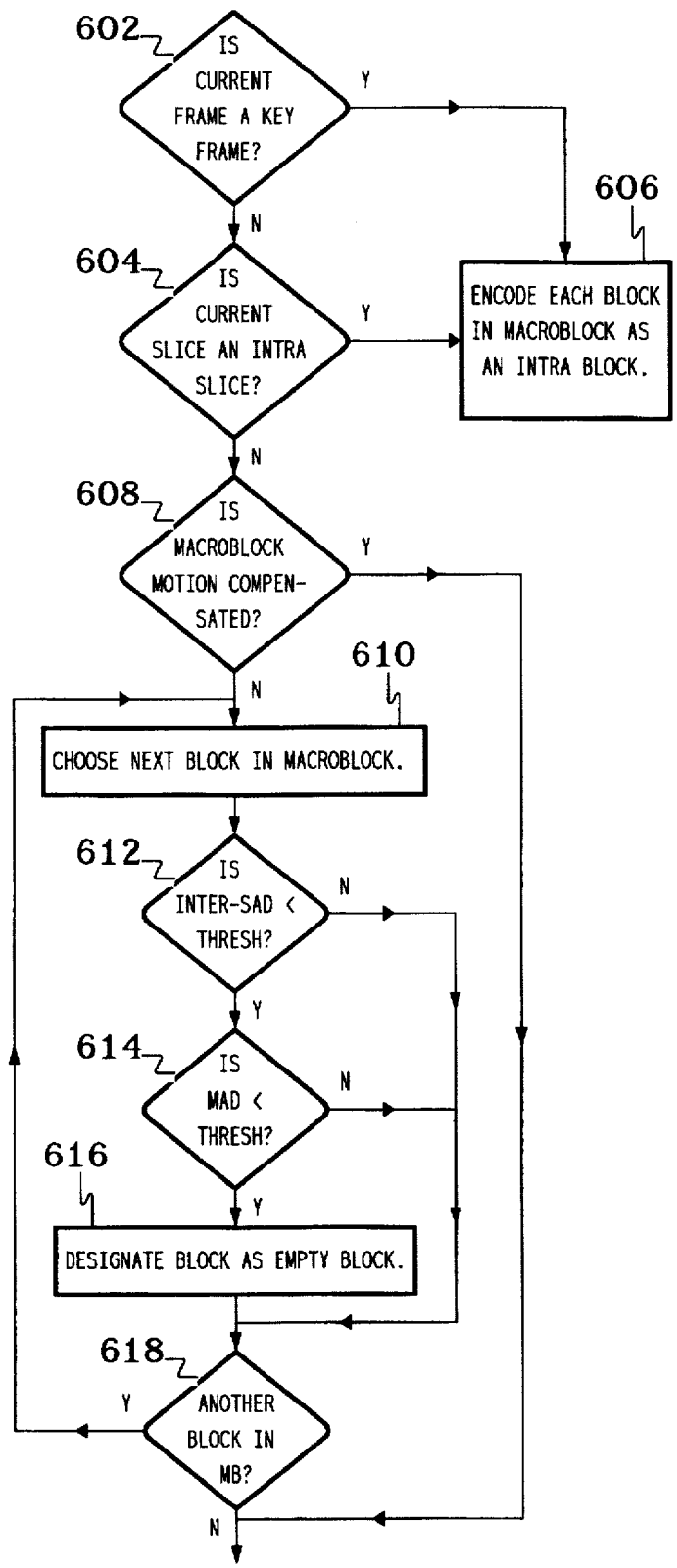

FIG. 6B. BLOCK CLASSIFICATION
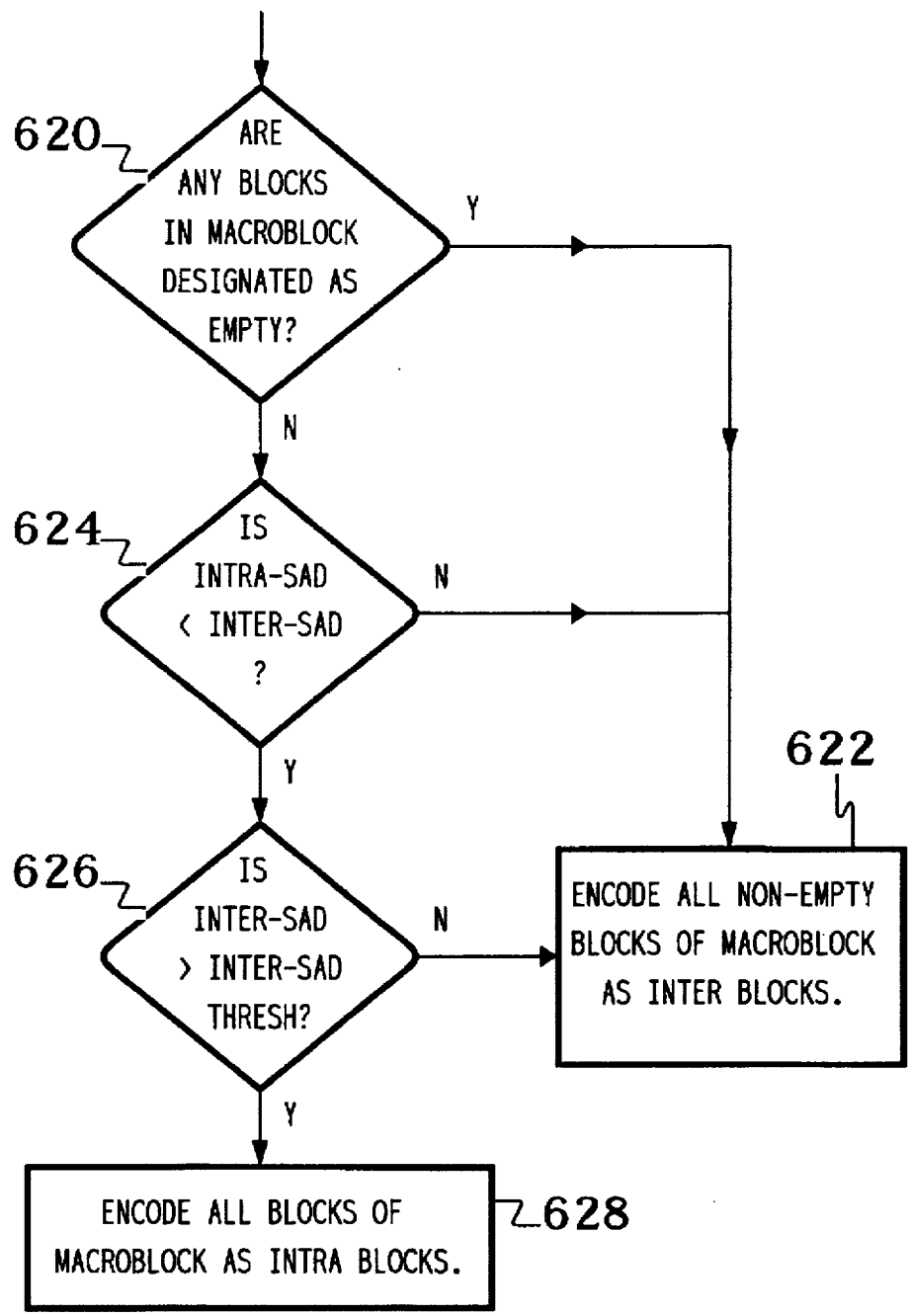

FIG. 7. THRESHOLD SELECTION
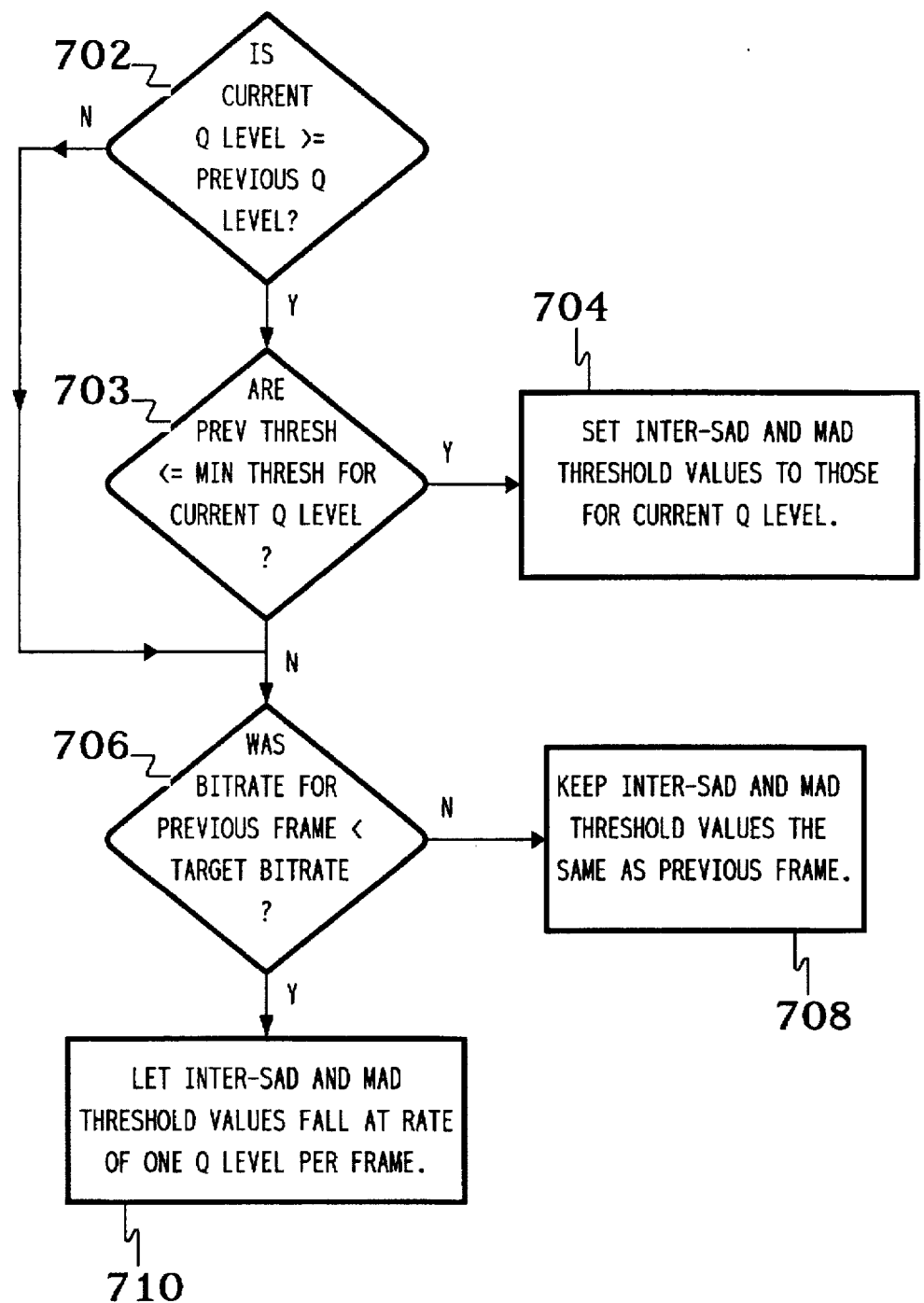

TWO-MEASURE BLOCK CLASSIFICATION SCHEME FOR ENCODING VIDEO IMAGES

BACKGROUND OF THE INVENTION

1. Field of the Invention

The present invention relates to image processing, and, in particular, to block classification schemes for encoding video images using block transforms.

2. Description of the Related Art

Some block-based video encoders can encode blocks of image pixels using different encoding schemes. For example, a block may be encoded relative to a corresponding block of a reference frame using interframe encoding or the block may be encoded using intraframe encoding without reference to any other frame. Such encoders perform block classification to determine how each block is to be encoded. Block classification may be based on image statistics for (16×16) macroblock regions of the pixel images. The statistics are usually based on the mean squared error (MSE) or sum of absolute difference (SAD) measures. The MSE is expensive to calculate. While the SAD is more efficient to calculate, it has disadvantages in that it is not always a good measure of the number of bits required to encode or the visual quality of the resulting decoded image.

What is needed is a block classification scheme that is computationally inexpensive and yet achieves low bitrate and high image quality.

It is accordingly an object of this invention to overcome the disadvantages and drawbacks of the known art and to provide an improved scheme for classifying blocks for block-based video encoding.

It is a particular object of this invention to provide a block classification scheme that is computationally inexpensive and yet achieves low bitrate and high image quality.

Further objects and advantages of this invention will become apparent from the detailed description of a preferred embodiment which follows.

SUMMARY OF THE INVENTION

The present invention comprises a computer-implemented process, an apparatus, and a storage medium encoded with machine-readable computer program code for encoding video images. According to a preferred embodiment, a first statistical measure is generated for a current block of a current frame relative to a reference block of a reference frame, wherein the first statistical measure is a global measure. A second statistical measure is generated for the current block relative to the reference block, wherein the second statistical measure is a local measure. An encoding scheme is selected for the current block based on the first and second statistical measures, and the current block is encoded based on the selected encoding scheme.

BRIEF DESCRIPTION OF THE DRAWINGS

Other objects, features, and advantages of the present invention will become more fully apparent from the following detailed description of the preferred embodiment, the appended claims, and the accompanying drawings in which:

FIG. 1 is a block diagram of a video system for encoding video signals in a PC environment, according to a preferred embodiment of the present invention;

FIG. 2 is a computer system for decoding the video signals encoded by the computer system of FIG. 1, according to a preferred embodiment of the present invention;

FIG. 3 is a block diagram of the processing performed by the encoding system of FIG. 1 to encode the blocks of a predicted frame;

FIG. 4 shows the 64-point subsampling pattern used by the motion estimator of FIG. 3 to perform motion estimation;

FIG. 5 shows the 100-point subsampling pattern used by the statistics generator of FIG. 3 to generate the statistical measures for the current macroblock;

FIGS. 6A-B show a flow diagram of the processing implemented by the block classifier of FIG. 3 for each macroblock; and FIG. 7 is a flow diagram of the processing implemented by the bit rate controller of FIG. 3 to dynamically vary the inter-SAD and MAD threshold values.

DESCRIPTION OF THE PREFERRED EMBODIMENT(S)

The present invention is directed to block classification schemes for encoding video images using block transform-based encoding. In a preferred embodiment, two statistical measures (a sum of absolute differences and a maximum absolute difference) are compared to threshold values that vary from frame to frame with quantization level to determine which blocks may be encoded as empty or skipped blocks.

System Hardware Architectures

Referring now to FIG. 1, there is shown a computer system 100 for encoding video signals, according to a preferred embodiment of the present invention. Analog-to-digital (A/D) converter 102 of encoding system 100 receives analog video signals from a video source. The video source may be any suitable source of analog video signals such as a video camera or VCR for generating local analog video signals or a video cable or antenna for receiving analog video signals from a remote source. A/D converter 102 decodes (i.e., separates the signal into constituent components) and digitizes the analog video signals into digital video component signals (e.g., in one embodiment, 8-bit R, G, and B component signals).

Capture processor 104 captures the digitized component signals received from converter 102. Capturing may include one or more of color conversion (e.g., RGB to YUV), scaling, and subsampling. Each captured video frame is represented by a set of three two-dimensional component planes, one for each component of the digitized video signals. In one embodiment, capture processor 104 captures video signals in a YUV9 (i.e., YUV 4:1:1) format, in which every (4×4) block of pixels of the Y-component plane corresponds to a single pixel in the U-component plane and a single pixel in the V-component plane. Capture processor 104 selectively stores the captured signals to memory device 112 and/or mass storage device 120 via system bus 114. Those skilled in the art will understand that, for real-time encoding, the captured signals are preferably stored to memory device 112, while for non-real-time encoding, the captured signals are preferably stored to mass storage device 120.

During real-time encoding, host processor 116 reads the captured bitmaps from memory device 112 via high-speed memory interface 110 and generates encoded video signals that represent the captured video signals. Depending upon the particular encoding scheme implemented, host processor 116 applies a sequence of compression steps to reduce the amount of data used to represent in the information in the video signals. The encoded video signals are then stored to memory device 112 via memory interface 112 and/or mass storage device 120 via system bus 114. Host processor 116 may copy the encoded video signals to mass storage device 120 and/or transmit the encoded video signals to transmitter 118 for real-time transmission to a remote receiver (not shown in FIG. 1).

Referring now the FIG. 2, there is shown a computer system 200 for decoding the video signals encoded by encoding system 100 of FIG. 1, according to a preferred embodiment of the present invention. Encoded video signals are either read from mass storage device 212 of decoding system 200 or received by receiver 210 from a remote transmitter, such as transmitter 118 of FIG. 1. The encoded video signals are stored to memory device 214 via system bus 206.

Host processor 208 accesses the encoded signals stored in memory device 214 via high-speed memory interface 216 and decodes the encoded video signals for display. Decoding the encoded video signals involves undoing the compression processing implemented by encoding system 100 of FIG. 1. Host processor 208 stores the decoded video signals to memory device 214 via memory interface 216 from where they are transmitted to display processor 202 via system bus 206. Alternatively, host processor 208 transmits the decoded video signals directly to display processor 202 via system bus 206. Display processor 202 processes the decoded video signals for display on monitor 204. The processing of display processor 202 includes digital-to-analog conversion of the decoded video signals. After being decoded by host processor 208 but before being D/A converted by display processor 202, the decoded video signals may be upsampled (e.g., from YUV9 to YUV24), scaled, and/or color converted (e.g., from YUV24 to RGB24). Depending upon the particular embodiment, each of these processing steps may be implemented by either host processor 208 or display processor 202.

Referring again to FIG. 1, encoding system 100 is preferably a microprocessor-based personal computer (PC) system with a special purpose video-processing plug-in board. In particular, A/D converter 102 may be any suitable means for decoding and digitizing analog video signals. Capture processor 104 may be any suitable processor for capturing digitized video component signals as subsampled frames. In a preferred embodiment, A/D converter 102 and capture processor 104 are contained in a single plug-in board capable of being added to a microprocessor-based PC system.

Host processor 116 may be any suitable means for controlling the operations of the special-purpose video processing board and for performing video encoding. Host processor 116 is preferably an Intel® general-purpose microprocessor such as an Intel® i486™, Pentium™, or higher processor. System bus 114 may be any suitable digital signal transfer device and is preferably a Peripheral Component Interconnect (PCI) bus. Memory device 112 may be any suitable computer memory device and is preferably one or more dynamic random access memory (DRAM) devices. High-speed memory interface 110 may be any suitable means for interfacing between memory device 112 and host processor 116. Mass storage device 120 may be any suitable means for storing digital signals and is preferably a computer hard drive. Transmitter 118 may be any suitable means for transmitting digital signals to a remote receiver. Those skilled in the art will understand that the encoded video signals may be transmitted using any suitable means of transmission such as telephone line, RF antenna, local area network, or wide area network.

Referring again to FIG. 2, decoding system 200 is preferably a microprocessor-based PC system similar to the basic PC system of encoding system 100. In particular, host processor 208 may be any suitable means for decoding encoded video signals and is preferably an Intel® general purpose microprocessor such as an Intel® i486™, Pentium™, or higher processor. System bus 206 may be any suitable digital signal transfer device and is preferably a PCI bus. Mass storage device 212 may be any suitable means for storing digital signals and is preferably a CD-ROM device or a hard drive. Receiver 210 may be any suitable means for receiving the digital signals transmitted by transmitter 118 of encoding system 100. Display processor 202 may be any suitable device for processing video signals for display (including converting the digital video signals to analog video signals) and is preferably implemented through a PC-based display system such as a VGA or SVGA system. Monitor 204 may be any means for displaying analog signals and is preferably a VGA monitor.

In a preferred embodiment, encoding system 100 of FIG. 1 and decoding system 200 of FIG. 2 are two distinct computer systems. In an alternative preferred embodiment of the present invention, a single computer system comprising all of the different components of systems 100 and 200 may be used to encode and decode video signals. Those skilled in the art will understand that such a combined system may be used to display decoded video signals in real-time to monitor the capture and encoding of video signals.

In alternative embodiments of present invention, the video encode processing of an encoding system and/or the video decode processing of a decoding system may be assisted by a pixel processor, such as an Intel® i750PE™ processor, or other suitable component(s) to off-load processing from the host processor by performing computationally intensive operations.

Block Classification Scheme

Under the present invention, video images are encoded using motion-compensated block transform-based image encoding techniques. According to a preferred embodiment, frames are encoded as either predicted frames or key frames. A predicted frame is encoded with reference to at least one other frame. A key frame is encoded without reference to any other frames. Each component plane of each frame is divided into (8×8) blocks and each block is encoded as either an inter block, an intra block, or an empty (or skipped) block.

An inter (or predicted) block is encoded using the pixel differences between the pixels of the block and the pixels of a corresponding block of a reference frame. An intra block is encoded without reference to any other frame. An empty block is a block that is sufficiently similar to the corresponding reference block. Rather than encode the interframe pixel differences or intraframe pixels, a special code is placed in the bitstream to instruct the decoder to replicate the block from the reference frame. Allowing blocks to be encoded as empty blocks reduces the size of the encoded bitstream at the cost of some loss of video quality.

In a key frame, all blocks are encoded as intra blocks. On the other hand, a predicted frame may be encoded as a mixture of inter, intra, and empty blocks. In a preferred embodiment, each component plane of each frame is divided into (8×8) blocks; (2×2) arrays of blocks are grouped into (16×16) macroblocks; and one or more rows of macroblocks are grouped into slices, where a slice may be as big as an entire component plane. In this embodiment, one or more slices within a predicted frame may be designated as an intra slice. All of the blocks of an intra slice are encoded as intra blocks.

When encoding the non-intra slices of a predicted frame, block classification is performed to determine whether to encode a block as an inter block, an intra block, or an empty block. Block classification attempts to balance two conflicting goals: a small encoded bitstream and high-quality decoded images. Of the three types of blocks, an empty block typically requires the least number of bits to encode, but at the greatest cost to image quality. The decision between encoding a block as an inter block or an intra block may be based almost solely on the number of bits to encode since image quality is the same on the average for both schemes. On the other hand, a block should be encoded as an empty block only if the "cost" of ignoring the differences between the current block and the reference block does not "outweigh" the "benefit" of using fewer bits in the bitstream. This can be a subjective determination.

Inter blocks are encoded by applying a block transform (e.g., a discrete cosine transform (DCT) or slant transform) to motion-compensated pixel differences, quantizing the transform coefficients, run-length encoding the quantized coefficients, and variable-length encoding the run-length codes using Huffman-type entropy or statistical encoding. Intra blocks are encoded in a similar fashion, except that the block transform is applied to the block pixels rather than to pixel differences. Empty blocks are encoded using a special code in the Huffman codebook used to encode the block types of the frame.

Referring now to FIG. 3, there is shown a block diagram of the processing performed by encoding system 100 of FIG. 1 to encode the blocks of a predicted frame, according to a preferred embodiment of the present invention. Motion estimator 302 performs motion estimation at the (16×16) macroblock level to identify the corresponding regions of the reference frame that "best match" the macroblocks of the current frame. Block-classification statistics generator 304 generates the block- and macroblock-level statistical measures used to classify the blocks of each macroblock. Block classifier 306 determines how to encode the blocks of the current frame (i.e., as inter, intra, or empty blocks). Block encoder 308 then encodes the blocks using the encoding schemes selected by block classifier 306.

In conventional block classification schemes, the decision as to how to encode each block is typically based on statistical measures, for example, the inter-SAD and the intra-SAD. The inter-SAD is the sum of absolute differences between the current block and the corresponding block of the reference frame, and is defined by the following equation:

$$\text{inter-SAD} = \Sigma |curr(i,j) - prev(i,j)| \quad (1)$$

where:

curr(i,j) is pixel (i,j) of the current block; and prev(i,j) is pixel (i,j) of the reference block.

The intra-SAD is the sum of absolute differences between the pixels of the current block and the average pixel for the current block, and is defined by the following equation:

$$\text{intra-SAD} = \Sigma |curr(i,j) - avg| \quad (2)$$

where avg is the average pixel value for the current block. For example, if the inter-SAD for the zero motion vector (ZMV) case (i.e., the inter-SAD without motion compensation) is less than a specified threshold value, then the block is encoded as an empty block. Otherwise, if the intra-SAD is less than the motion-compensated inter-SAD, then the block is encoded using intraframe encoding. Otherwise, the block is encoded using motion-compensated interframe encoding.

The inventors have discovered that this scheme for classifying blocks for encoding forces certain blocks to be encoded as empty blocks which should be encoded using interframe or intraframe encoding. That is, under this scheme, the advantage gained in reducing the size of the encoded bitstream for these blocks does not compensate for the associated reduction in image quality. In other words, it would be better to use the extra bits required to encode these blocks using interframe or intraframe encoding rather than accept the corresponding loss of image quality.

In particular, the inventors have determined that a block having a few relatively large interframe pixel differences and many relatively small interframe pixel differences should not be encoded as an empty block. Using the conventional block classification scheme based entirely on the SAD measures may force such blocks to be encoded as empty blocks. If the inter-SAD threshold is set high enough to ensure that these blocks are not encoded as empty blocks, then other blocks that should be encoded as empty blocks will be encoded as either inter or intra blocks.

According to preferred embodiments of the present invention, block classification is based not just on a single statistical measure, such as the SAD, but on two statistical measures. In a preferred embodiment, block classification is based on the SAD measure and on the maximum-absolute-difference (MAD) measure. The MAD measure is the largest absolute pixel difference between the pixels of the current block and the pixels of the reference block, and is defined by the following equation:

$$\text{MAD} = \text{MAX}|curr(i,j) - prev(i,j)| \quad (3)$$

where MAX returns the largest absolute pixel difference.

Those skilled in the art will understand that the SAD measure is an example of a global measure, while the MAD measure is an example of a local measure. A global measure attempts to characterize the overall or general nature of the entire block. A local measure, on the other hand, characterizes the nature of only a relatively small subset of the block pixels and perhaps as few as only a single pixel of the block. According to the present invention, block classification is based on both a global measure and a local measure.

Figure 4:
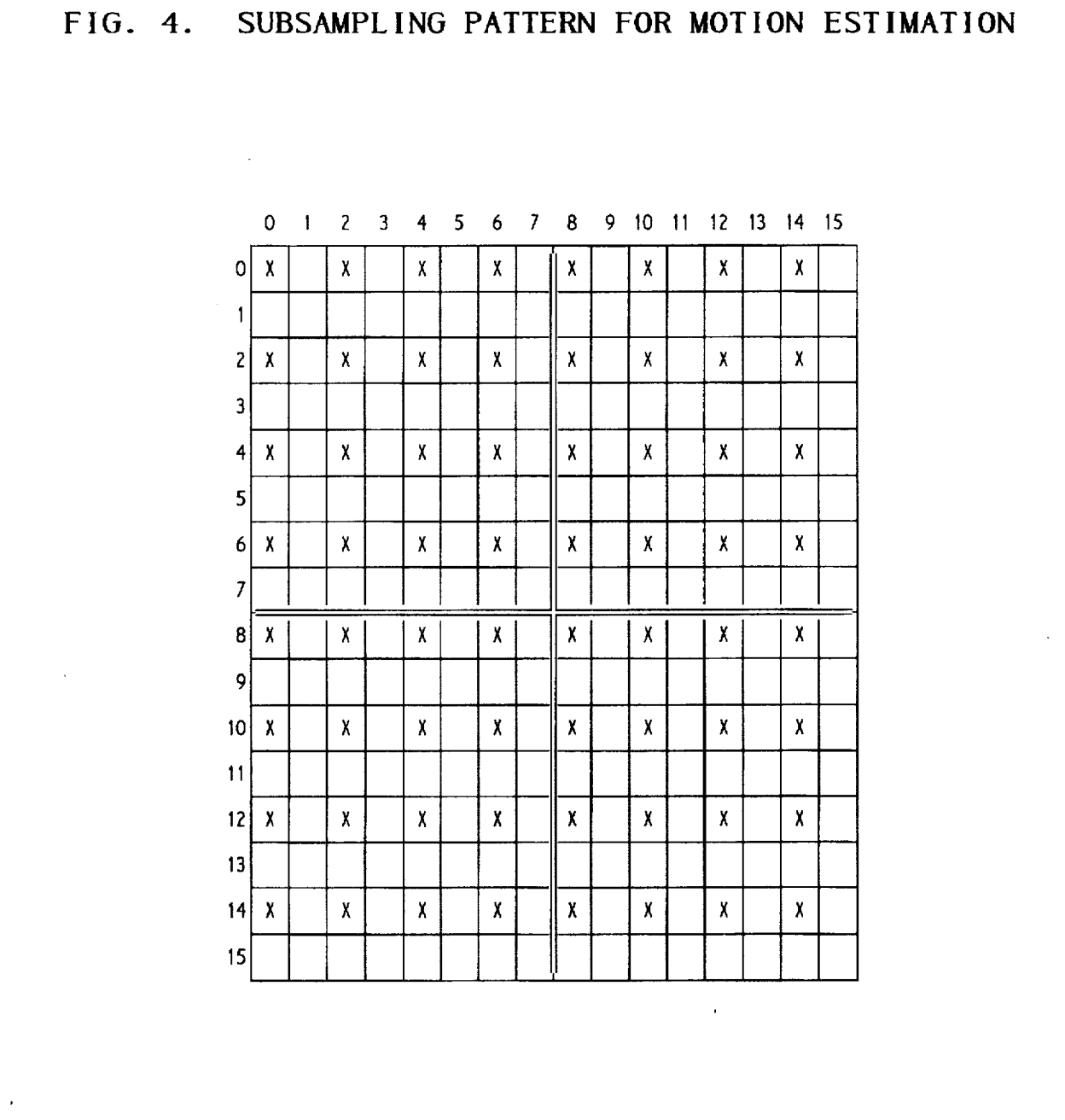

Referring again to FIG. 3, motion estimator 302 performs motion estimation on the current frame relative to the reference frame. In a preferred embodiment, motion estimator 302 uses the inter-SAD measure defined by Equation (1) to identify the (16×16) region of the reference frame that most closely matches the current (16×16) macroblock of the current frame. FIG. 4 shows the 64-point subsampling pattern used by motion estimator 302 to perform motion estimation, according to a preferred embodiment of the present invention. Those pixels used in motion estimation are indicated with an "X" in FIG. 4. A subsampling pattern is used to reduce the computational cost of performing motion estimation. The 64-point pattern of FIG. 4 was selected to balance computational speed against the accuracy of the interframe comparison.

After motion estimator 302 identifies the motion vector that corresponds to the region of the reference frame that best matches the current macroblock, block-classification statistics generator 304 generates additional statistical measures that will be used to classify the blocks of the current macroblock. Those skilled in the art will understand that, in alternative embodiments, statistics generator 304 generates the statistical measures used by motion estimator 302 to select motion vectors for the current macroblock. FIG. 5 shows the 100-point subsampling pattern used by statistics generator 304 to generate the statistical measures for the current macroblock, according to a preferred embodiment of the present invention. Those pixels used in generating the statistical measures are indicated with an "X" in FIG. 5. The subsampling pattern of FIG. 5 was selected to provide a balance between computational speed and accurately characterizing the nature of the blocks. Those skilled in the art will understand that other pixel subsampling patterns may also be used.

A macroblock-level measure is preferably generated by (1) generating the block-level measure for each of the four blocks and then (2) generating the macroblock-level measure from the four block-level measures. For example, statistics generator 304 generates four block inter-SAD measures of Equation (1) using 25-points for each block and then generates the macroblock inter-SAD by summing the four block inter-SAD measures together. Similarly, statistics generator 304 generates four block intra-SAD measures of Equation (2) using 25-points for each block and then generates the macroblock intra-SAD by summing the four block intra-SAD measures together.

If motion estimator 302 determines that the best match corresponds to the zero motion vector (ZMV) case (or if motion compensation is disabled), then motion estimator 302 also computes the MAD measure of Equation (3) for each block of the macroblock.

Block classifier 306 receives the statistical measures generated by statistics generator 304 and performs block classification to determine how to encode the blocks of the current macroblock. The selected block types are passed to block encoder 308, which encodes the blocks of the current frame using the appropriate encoding schemes to generate the encoded block signals for the current frame.

Referring now to FIGS. 6A–B, there is shown a flow diagram of the processing implemented by block classifier 306 of FIG. 3 for each macroblock, according to a preferred embodiment of the present invention. Block classifier 306 determines whether any of the blocks of the current macroblock are to be encoded as empty blocks. Block classifier 306 then applies inter vs. intra decision-making to the macroblock. In general, the blocks of a macroblock may be encoded as all intra, all inter, all empty, or a mixture of inter and empty. In alternative embodiments of the present invention, other combinations may be supported.

In particular, if the current frame is a key frame (step 602 or if the current slice (of a predicted frame) is an intra slice (step 604), then each block of the current macroblock is encoded as an intra block (step 606). Otherwise, processing continues to step 608.

Step 608 determines whether the current macroblock is motion compensated. A macroblock will not be motion compensated if either (1) motion compensation is disabled or (2) motion estimation determined that the closest match with respect to the reference frame corresponds to the zero motion vector (ZMV) case. In a preferred embodiment, if the current macroblock is motion compensated, then none of the blocks of the macroblock are allowed to be designated as empty blocks and processing continues to step 620. If, however, the current macroblock is not motion compensated, then processing continues to step 610 to determine whether any of the blocks of the macroblock are to be encoded as empty blocks.

Steps 610 and 618 sequentially select the four blocks of the current macroblock. If the inter-SAD for the selected block is less than a specified block-level inter-SAD threshold value (step 612) and if the MAD for the selected block is less than a specified block-level MAD threshold value (step 614), then the block is designated as an empty block (step 616). Otherwise, the block is left undesignated. Those skilled in the art will understand that only blocks having a small inter-SAD and a small MAD will be encoded as empty blocks. A block that has enough pixels with large enough interframe differences will have an inter-SAD greater than the specified threshold and will not be encoded as an empty block. Similarly, a block that has even a single pixel with a large interframe difference will have a MAD greater than the specified threshold and will not be encoded as an empty block. (If all of the blocks of a macroblock are designated as empty blocks, then the macroblock is designated as an empty macroblock which is encoded using a special code.)

After the empty-block designation processing is applied to all of the block of the current macroblock, processing continues to step 620 for macroblock-level inter vs. intra decision-making. If any of the blocks of the current macroblock have been designated as empty blocks (step 620), then intraframe encoding is not allowed for the macroblock and the rest of the blocks are encoded as inter blocks (step 622). Otherwise, none of the blocks have been designated as empty blocks and processing continues to step 624.

If the intra-SAD for the current macroblock is not less than the inter-SAD for the current macroblock (step 624), then the assumption is that interframe encoding will require fewer bits than intraframe encoding for the current macroblock. In that case, the blocks of the current macroblock are encoded as inter blocks (step 622). Otherwise, the intra-SAD is less than the inter-SAD and processing continues to step 626.

If the inter-SAD for the current macroblock is not greater than a specified macroblock-level inter-SAD threshold value (step 626), then, even though the intra-SAD is less than the inter-SAD, the assumption is that interframe encoding will do a good job encoding the current macroblock. In that case, the blocks of the current macroblock are again encoded as inter blocks (step 622). Otherwise, the inter-SAD is greater than the macroblock-level inter-SAD threshold and the assumption is that intraframe encoding will do a better job of encoding the current macroblock. In that case, the blocks of the current macroblock are encoded as intra blocks (step 628). For a macroblock inter-SAD based on a 100-point block inter-SAD, the macroblock inter-SAD threshold preferably has a value of 400.

Using the computationally inexpensive MAD measure in addition to the two SAD measures to perform block classification, improves the ability of block classifier 306 to determine which blocks to encode as empty blocks while still using SAD measures, resulting in improved bit rate and image quality, without having to use the computationally expensive MSE measure. The MAD measure corrects for some of the disadvantages of using the SAD as the primary metric for making encoding decisions as opposed to the MSE. One of the disadvantages of using a SAD measure over some other metric of distortion (such as MSE) is that pixel differences which are large in magnitude but spatially small (i.e., only a few pixels) tend to be diminished by the SAD metric. A few large pixel differences are essentially watered down by all of the other sampled pixels in the block.

Using the MAD measure counteracts the effect of watering down pixel differences in the SAD measure when only a few pixels out of the subsample are very different from the reference block. This is because the MAD is based on the maximum difference. Thus, even a single pixel with a large difference is sufficient to make the MAD large. Where SAD tends to underestimate the impact of a few large pixel differences in a block, the MAD tends to overestimate. When used together to make classification decisions, the SAD and MAD measures approximate the effectiveness of using the MSE measure or some other more perceptually meaningful measure of distortion, but without the added computational cost.

Another aspect of the preferred block classification scheme of the present invention is that the threshold values used to make the empty-block decisions (i.e., the block-level inter-SAD threshold and the block-level MAD threshold) vary with the quantization (Q) level used to quantize the transformed pixel data. Conventional block classification schemes use static thresholds that do not change with Q level. Since the quantization process produces a certain amount of pixel deviation in the coded blocks of the image, these differences show up in the statistical measures used to make the empty-block decision. The result is that, as Q level increases (i.e., quantization becomes more coarse), the number of macroblocks classified as empty drops.

The inventors have discovered that changing the inter-SAD and MAD threshold values as a function of the Q level improves the quality of the decoded video stream. As shown in FIG. 3, the inter-SAD and MAD threshold values used by block classifier 306 are preferably selected by bit rate controller 310. According to a preferred embodiment, each Q level has a corresponding inter-SAD threshold value and a corresponding MAD threshold value. The threshold values are derived empirically and calibrated for use with a set of default Q tables. If alternate Q tables are used, the threshold values are modified empirically to match the new tables.

To determine threshold values empirically, test sequences may be run at each fixed Q level using the selected Q tables. Each test sequence at each Q level is run with a variety of threshold values and the number of blocks coded (as opposed to those designated as empty blocks) per sequence is recorded. The threshold values selected for a given Q level are those that occur at the "knee" of the curves. At low threshold values, a relatively low number of empty blocks will be recorded. As the thresholds increase, so will the number of empty blocks. At some level, a point of diminishing returns is reached which indicates the approximate proper value for the threshold. The threshold is set to the first value that yields a decreasing number of additional empty blocks as a result of increasing the threshold (when averaged over a variety of sequences). This process may be performed iteratively as follows. An initial MAD threshold may be determined, holding the inter-SAD threshold constant at a selected initial value. The inter-SAD threshold may then be updated, holding the MAD threshold constant at the newly determined initial value. The MAD threshold may then be updated, holding the inter-SAD threshold constant at its updated value. The resulting threshold values match the Q levels and yield a smooth falloff in the number of blocks coded as Q level increases.

Table I shows preferred minimum threshold values for block-level inter-SAD and MAD measures for different Q levels, where the Q levels correspond to a preferred set of default Q tables. The preferred set of default Q tables is described in U.S. application Ser. No. 08/303,313, filed Sep. 8, 1994 as Attorney Docket No. 366403-997. The threshold values of Table I are weighted for the blocks of the 100-point subsampling pattern of FIG. 5. If a subsampling pattern with a different number of points is used, then the inter-SAD threshold values should be scaled accordingly.

TABLE I

Threshold Values for Default Q Tables.

| Quantization Level | Inter-SAD Threshold | MAD Threshold |
|---|---|---|
| 0 | 25 | 5 |
| 1 | 33 | 6 |
| 2 | 39 | 7 |
| 3 | 44 | 8 |
| 4 | 48 | 8 |
| 5 | 53 | 9 |
| 6 | 56 | 9 |
| 7 | 59 | 9 |
| 8 | 63 | 10 |
| 9 | 66 | 10 |
| 10 | 67 | 10 |
| 11 | 69 | 11 |
| 12 | 70 | 11 |
| 13 | 72 | 11 |
| 14 | 73 | 12 |
| 15 | 75 | 12 |

When the Q level changes from frame to frame, the threshold values used by block classifier 306 are also changed. When the Q level increases, the threshold values are preferably immediately changed to those values corresponding to the new Q level. However, when the Q level decreases, the threshold values are preferably only gradually changed (i.e., over a number of frames) to the threshold values for the new Q level.

Referring now to FIG. 7, there is shown a flow diagram of the processing implemented by bit rate controller 310 of FIG. 3 to dynamically vary the inter-SAD and MAD threshold values, according to a preferred embodiment of the present invention. The threshold values vary dynamically based upon the encoder's bit rate control decisions and previous bit rate performance. When bitrate controller 310 causes the Q level to rise, the inter-SAD and MAD threshold values immediately rise to the minimum values for the new Q level (unless they are already higher). When the Q level falls, the threshold values are permitted to fall at a rate of one Q level per frame, and then only if the bit rate for the previous frame fell below the target bit rate.

Referring again to FIG. 7, if the current Q level is greater than or equal to the previous Q level (step 702) and if the inter-SAD and MAD threshold values for the previous frame are less than or equal to the minimum inter-SAD and MAD threshold values for the current Q level (step 703), then the inter-SAD and MAD threshold values for the current frame are set to the minimum threshold values for the current Q level (step 704). Otherwise, processing continues to step 706.

If the bit rate for the previous frame was less than the target bit rate (step 706), then the inter-SAD and MAD threshold values are decremented at a rate of one Q level per frame until the threshold values corresponding to the current Q level are reached (step 710). If the target bit rate was not achieved, then the threshold values are kept the same as for the previous frame (step 708).

The immediate upward and gradual downward dynamic behavior of this scheme tends to smooth the bit rate impacts of empty block selection while maintaining optimal quality. This scheme yields higher and more consistent empty block selection (especially as Q level varies), which results in higher quality images (particularly in background areas) and more consistent and lower bit rates.

In a preferred embodiment, Level 4 is the maximum Q level for quantizing the U- and V-component planes. In this case, the maximum inter-SAD and MAD threshold values for U and V planes are 48 and 8, respectively, corresponding to level 4 in Table I. This extra conservatism in choosing empty blocks for the U and V planes helps to prevent color artifacts from occurring in the decoded images.

The block classification scheme of the present invention provides certain advantages over prior art schemes. Since the block classification scheme does a better job of accurately identifying which blocks should not be encoded as empty blocks, the empty-block selection can be more aggressive. As a result, more blocks can be encoded as empty blocks without degrading image quality. Since more blocks are encoded as empty blocks, the bitrate is reduced and both encode and decode times are decreased.

There are also visible improvements in using the present block classification scheme. The background (i.e., non-moving) portions of images are more stable. There is little change in background pixels from frame to frame. Once background pixels become sharp, they tend to stay sharp, even if the overall image quality goes down due to high motion in another part of the image. Moreover, since a significant number of bits are saved by not continuously retransmitting the background regions, the average Q level of the image can be reduced by one or two levels, resulting in a sharper image overall.

The present invention can be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer-implemented process for encoding video images, comprising the steps of:
   (a) generating a first statistical measure for a current block of a current frame relative to a reference block of a reference frame, wherein the first statistical measure is a global measure, wherein the first statistical measure is a sum-of-absolute-differences (SAD) measure;
   (b) generating a second statistical measure for the current block relative to the reference block, wherein the second statistical measure is a local measure, wherein the second statistical measure is a maximum-absolute-difference (MAD) measure;
   (c) selecting an encoding scheme for the current block based on the first and second statistical measures; and
   (d) encoding the current block based on the selected encoding scheme;
   wherein if the inter-SAD measure is less than a specified inter-SAD threshold value and if the MAD measure is less than a specified MAD threshold value, then step (c) comprises the step of designating the current block as an empty block and step (d) comprises the step of encoding the current block as an empty block.

2. The process of claim 1, wherein step (a) comprises the step of generating the first statistical measure based on a subset of pixels of the current block.

3. The process of claim 1, wherein the current block is an (8×8) block.

4. An apparatus for encoding video images, comprising:
   (a) means for generating a first statistical measure for a current block of a current frame relative to a reference block of a reference frame, wherein the first statistical measure is a global measure, wherein the first statistical measure is a sum-of-absolute-differences (SAD) measure;
   (b) means for generating a second statistical measure for the current block relative to the reference block, wherein the second statistical measure is a local measure, wherein the second statistical measure is a maximum-absolute-difference (MAD) measure;
   (c) means for selecting an encoding scheme for the current block based on the first and second statistical measures; and
   (d) means for encoding the current block based on the selected encoding scheme;
   wherein if the inter-SAD measure is less than a specified inter-SAD threshold value and if the MAD measure is less than a specified MAD threshold value, then means (c) designates the current block as an empty block and means (d) encodes the current block as an empty block.

5. The apparatus of claim 4, wherein means (a) generates the first statistical measure based on a subset of pixels of the current block.

6. The apparatus of claim 4, wherein the current block is an (8×8) block.

7. A storage medium having stored thereon a plurality of instructions for encoding video images, wherein the plurality of instructions, when executed by a processor, cause the processor to perform the steps of:
   (a) generating a first statistical measure for a current block of a current frame relative to a reference block of a reference frame, wherein the first statistical measure is a global measure, wherein the first statistical measure is a sum-of-absolute-differences (SAD) measure;
   (b) generating a second statistical measure for the current block relative to the reference block, wherein the second statistical measure is a local measure, wherein the second statistical measure is a maximum-absolute-difference (MAD) measure;
   (c) selecting an encoding scheme for the current block based on the first and second statistical measures; and
   (d) encoding the current block based on the selected encoding scheme;
   wherein if the inter-SAD measure is less than a specified inter-SAD threshold value and if the MAD measure is less than a specified MAD threshold value, then step (c) comprises the step of designating the current block as an empty block and step (d) comprises the step of encoding the current block as an empty block.

8. The storage medium of claim 7, wherein means (a) causes the computer to generate the first statistical measure based on a subset of pixels of the current block.

9. The storage medium of claim 7, wherein the current block is an (8×8) block.

10. A computer-implemented process for encoding video images, comprising the steps of:

(a) generating a first statistical measure for a current block of a current frame relative to a reference block of a reference frame, wherein the first statistical measure is a global measure wherein the first statistical measure is generated based on a subset of pixels of the current block;

(b) generating a second statistical measure for the current block relative to the reference block, wherein the second statistical measure is a local measure;

(c) selecting an encoding scheme for the current block based on the first and second statistical measures; and (d) encoding the current block based on the selected encoding scheme.

11. A computer-implemented process for encoding video images, comprising the steps of:

(a) generating a first statistical measure for a current block of a current frame relative to a reference block of a reference frame, wherein the first statistical measure is a global measure;

(b) generating a second statistical measure for the current block relative to the reference block, wherein the second statistical measure is a local measure;

(c) generating a third statistical measure for the current block independent of the reference block;

(d) selecting an encoding scheme for the current block based on the first, second, and third statistical measures; and (e) encoding the current block based on the selected encoding scheme.

12. The process of claim 11, wherein the third statistical measure is an intra-SAD measure.

13. The process of claim 11, wherein:

if the first statistical measure is less than a first specified threshold and if the second statistical measure is less than a second specified threshold; then step (d) comprises the step of classifying the current block as an empty block and step (e) comprises the step of encoding the current block as an empty block;

otherwise, if the third statistical measure is less than the first statistical measure, then step (d) comprises the step of classifying the current block as an intra block and step (e) comprises the step of encoding the current block as an intra block;

otherwise, step (d) comprises the step of classifying the current block as an inter block and step (e) comprises the step of encoding the current block as an inter block.

* * * * *